US011431206B2

(12) United States Patent
Ha et al.

(10) Patent No.: US 11,431,206 B2
(45) Date of Patent: Aug. 30, 2022

(54) METHOD AND DEVICE FOR STABILIZING COMMUNICATION PERFORMANCE DURING WIRELESS POWER TRANSMISSION

(71) Applicant: Samsung Electronics Co., Ltd., Suwon-si (KR)

(72) Inventors: Mincheol Ha, Suwon-si (KR); Dongzo Kim, Suwon-si (KR); Hyungkoo Chung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/173,000

(22) Filed: Feb. 10, 2021

(65) Prior Publication Data

US 2021/0249913 A1 Aug. 12, 2021

(30) Foreign Application Priority Data

Feb. 10, 2020 (KR) .................. 10-2020-0015603

(51) Int. Cl.
*H02J 50/10* (2016.01)
*H02J 50/80* (2016.01)
*H04W 4/80* (2018.01)

(52) U.S. Cl.
CPC .............. *H02J 50/80* (2016.02); *H02J 50/10* (2016.02); *H04W 4/80* (2018.02)

(58) Field of Classification Search
CPC . H02J 50/10; H02J 50/12; H02J 50/80; H04B 5/0031; H04B 5/0037; H04B 5/0075; H04B 5/0093
See application file for complete search history.

(56) References Cited

U.S. PATENT DOCUMENTS

| 9,276,435 | B2 | 3/2016 | Chen et al. | |
| 2011/0278949 | A1* | 11/2011 | Tsai | ........................ H02J 50/70 307/104 |

(Continued)

FOREIGN PATENT DOCUMENTS

| EP | 3 432 445 A1 | 1/2019 |
| KR | 10-2014-0057151 A | 5/2014 |

(Continued)

OTHER PUBLICATIONS

International Search Report dated Jun. 3, 2021 in connection with International Patent Application No. PCT/KR2021/001226, 3 pages.

(Continued)

*Primary Examiner* — Levi Gannon

(57) ABSTRACT

An electronic device includes a coil, and at least one control circuit electrically connected to the coil. The control circuit is configured to transmit power to an external device via the coil by using a first frequency belonging to a first frequency band, receive a packet related with wireless charging from the external device via the coil, in response to having failed to receive the packet within a first reference time, change at least one of an amplitude of the power transmitted or the first frequency used for the transmitting of the power, and to transmit power to the external device via the coil on the basis of the at least one of the changed transmit power or the changed frequency.

20 Claims, 13 Drawing Sheets

(56) References Cited

U.S. PATENT DOCUMENTS

| | | | |
|---|---|---|---|
| 2013/0063083 A1 | 3/2013 | Park et al. | |
| 2013/0082536 A1* | 4/2013 | Taylor | H01F 38/14 307/104 |
| 2013/0154558 A1* | 6/2013 | Lee | H02J 50/90 320/108 |
| 2018/0351391 A1 | 12/2018 | Park | |
| 2019/0058360 A1 | 2/2019 | Garbus et al. | |
| 2019/0356152 A1 | 11/2019 | Melgarejo et al. | |
| 2021/0257865 A1* | 8/2021 | Enomoto | H02J 7/00714 |

FOREIGN PATENT DOCUMENTS

| | | |
|---|---|---|
| KR | 10-2017-0095497 A | 8/2017 |
| KR | 10-1976625 B1 | 5/2019 |
| KR | 10-2020-0003495 A | 1/2020 |
| WO | 2017/176128 A1 | 10/2017 |
| WO | 2019/225806 A1 | 11/2019 |

OTHER PUBLICATIONS

Written Opinion of the International Searching Authority dated Jun. 3, 2021 in connection with International Patent Application No. PCT/KR2021/001226, 4 pages.

* cited by examiner

METHOD AND DEVICE FOR STABILIZING COMMUNICATION PERFORMANCE DURING WIRELESS POWER TRANSMISSION

CROSS-REFERENCE TO RELATED APPLICATION

This application is based on and claims priority under 35 U.S.C. § 119 to Korean Patent Application No. 10-2020-0015603 filed on Feb. 10, 2020 in the Korean Intellectual Property Office, the disclosure of which is incorporated by reference herein in its entirety.

BACKGROUND

1. Field

Various embodiments disclosed in the present document relate to a method and device for preventing the deterioration of communication performance during wireless power transmission.

2. Description of Related Art

With the development of a wireless charging technology which uses a wireless power transmission technology, a wireless power transmitting device can charge a battery of a wireless power receiving device wirelessly, without a separate charging connector, via a coil of the wireless power transmitting device. The wireless power transmitting device may require a function of data communication so as to control the identifying of the wireless power receiving device, power level control, and foreign object detection (FOD), etc. during wireless power transmission. The data communication during the wireless power transmission may include in-band communication and out-band communication. The in-band communication uses the same frequency band as a frequency band which is used for the wireless power transmission. The out-band communication uses a different frequency band from the frequency band which is used for the wireless power transmission.

The above information is presented as background information only to assist with an understanding of the present disclosure. No determination has been made, and no assertion is made, as to whether any of the above might be applicable as prior art with regard to the present disclosure.

SUMMARY

In-band communication by a wireless device during the wireless power transmission can use the same frequency band as the frequency band which is used for the wireless power transmission. Because of this, an in-band communication environment may be deteriorated according to a load condition of the wireless power receiving device and an external noise (e.g., a power source noise and a touch noise). Owing to the deterioration of the in-band communication, the wireless power transmitting device may fail to receive a packet related with wireless power transmission from the wireless power receiving device. Owing to the failure to receive the packet related with the wireless power transmission, the wireless power transmitting device may not perform a packet based operation, or the interruption of the wireless power transmission can take place.

Various embodiments disclosed in the present document may present a device and method, etc. for solving the aforementioned problems.

Electronic devices according to certain embodiments of this disclosure may be an electronic device including a coil, and at least one control circuit electrically connected to the coil. The control circuit is configured to transmit power to an external device via the coil by using a first frequency belonging to a first frequency band, receive a packet related with wireless charging from the external device via the coil, in response to having failed to receive the packet within a first reference time, change at least one of an amplitude of the power transmitted or the first frequency used for the transmitting of the power, and transmit power to the external device via the coil on the basis of the at least one of the changed transmit power or the changed frequency.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrase.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to the description of the drawings, the same or similar reference numerals may be used to refer to the same or similar components.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments are mentioned below with reference to the accompanying drawings. However, these do not intend to limit a specific embodiment form, and it should be understood to include various modifications, equivalents, and/or alternatives, of an embodiment.

Figure 1:
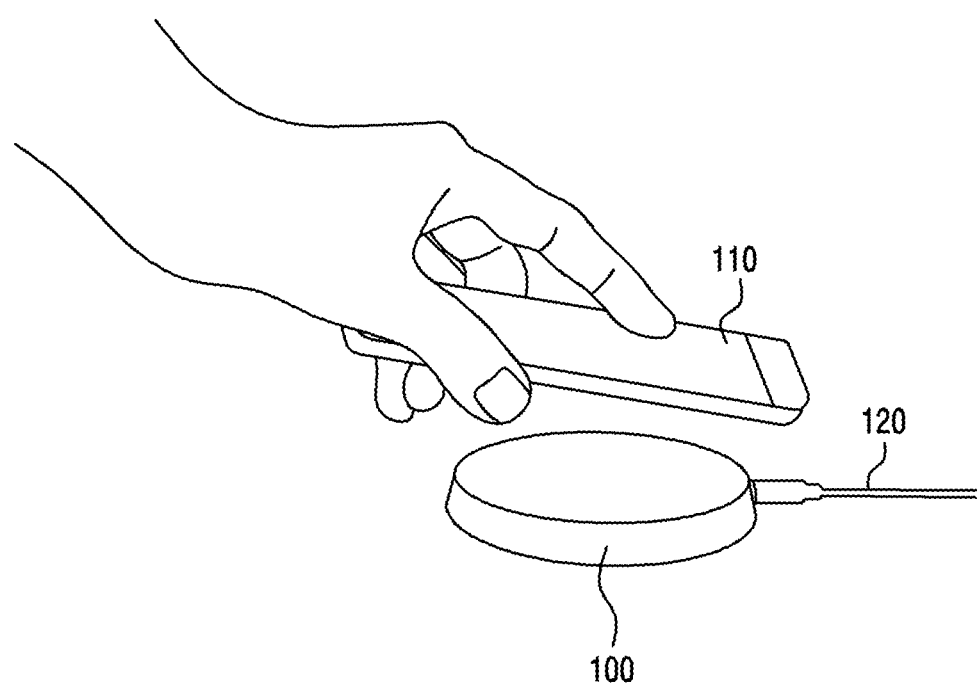
FIG. 1 illustrates an example of a system of wireless power transmission according to certain embodiments of this disclosure.

FIG. 1 illustrates an example of a system of wireless power transmission according to certain embodiments of this disclosure.

Referring to the non-limiting example of FIG. 1, the system of wireless power transmission may include an electronic device 100 (e.g., a wireless power transmitting device or a battery charger), an external device 110 (e.g., a wireless power receiving device or a portable terminal), and a power supply device 120. The system of wireless power transmission may not be limited to components (e.g., the electronic device 100, the external device 110, and the power supply device 120) illustrated in FIG. 1. For example, the system of wireless power transmission may further include at least one external device different from the external device 110.

According to certain embodiments of this disclosure, the electronic device 100 may be connected with the power supply device 120. The electronic device 100 may receive power (or electric current) from the power supply device 120. The electronic device 100 may transmit the power (or electric current) received from the power supply device 120, to the external device 110 via a coil inside the electronic device 100. For example, the electronic device 100 may transmit the power to the external device 110 wirelessly via the coil inside the electronic device 100.

According to certain embodiments of this disclosure, the electronic device 100 may perform data communication with the external device 110, through the coil inside the electronic device 100, during wireless power transmission. The data communication during the wireless power transmission may include first communication (e.g., in-band communication) or second communication (out-band communication). It may be understood that the first communication is communication which uses the same frequency band as a frequency band which is used for the wireless power transmission, and the second communication is communication which uses a different frequency band from the frequency band which is used for the wireless power transmission.

According to certain embodiments of this disclosure, the first communication may be understood to be communication which uses another frequency band approximate to the frequency band which is used for the wireless power transmission. For example, the electronic device 100 may filter a signal of another frequency band coupled to the wireless power transmission signal, and perform the first communication with the external device 110 through the another frequency band.

According to certain embodiments of this disclosure, the first communication may support communication execution between the electronic device 100 and the external device 110 by using a coil which is used for wireless power transmission of the electronic device 100, and the second communication may support communication execution between the electronic device 100 and the external device 110 by using a separate antenna different from the coil which is used for the wireless power transmission of the electronic device 100. For example, the electronic device 100 may form a magnetic field signal, by applying a wireless power signal and a data signal to the coil through the first communication (e.g., the in-band communication). Through the magnetic field signal formed using the coil, the electronic device 100 may perform data communication with the external device 110. For another example, by using a separate antenna not the coil having applied the wireless power signal, the electronic device 100 may perform data communication with the external device 110 through the second communication (e.g., the out-band communication).

According to certain embodiments of this disclosure, the electronic device 100 may transmit data to the external device 110, or receive data from the external device 110, via the coil inside the electronic device 100. For example, the electronic device 100 may transmit data related with wireless power transmission, to the external device 110. For another example, the electronic device 100 may receive, from the external device 110, data related with a power level that the external device 110 receives from the electronic device 100. For further example, the electronic device 100 may receive, from the external device 110, data related with whether the external device 110 gets in contact with a housing of the electronic device 100. For yet another example, the electronic device 100 may receive, from the external device 110, data related with setting of a wireless power transmission signal that the external device 110 outputs. For example, the data related with the setting of the wireless power transmission signal may be data of a signal related to a voltage, current, or power level which is applied to an output signal of the electronic device 100.

According to certain embodiments of this disclosure, the electronic device 100 may sense the external device 110's presence around the electronic device 100 through a sensor (not shown) included in the electronic device 100. For example, the electronic device 100 may sense the external device 110 which is in contact with the housing of the electronic device 100.

According to certain embodiments of this disclosure, the external device 110 may be understood to be various electronic devices capable of wirelessly receiving power via coils inside the electronic devices and charging batteries of the electronic devices. For example, the external device 110 may include a portable terminal, a tablet PC, a Bluetooth earphone, or a smart watch. A component of the external device 110 may correspond to an electronic device 901 of FIG. 9.

Figure 2:
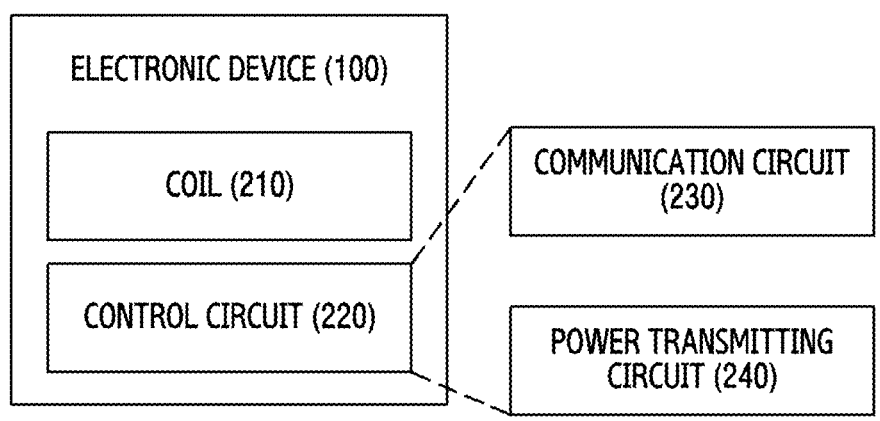
FIG. 2 illustrates in block diagram format, an example of an electronic device 100 according to certain embodiments of this disclosure.

FIG. 2 illustrates in block diagram format, an example of an electronic device 100, according to certain embodiments of this disclosure.

Referring to the illustrative example of FIG. 2, the electronic device 100 may include a coil 210 and a control circuit 220. Components included in the electronic device 100 may not be limited to the components (e.g., the coil 210 and the control circuit 220) shown in the block diagram of FIG. 2. The components of the electronic device 100 shown in FIG. 2 may be substituted with other components, or additional components may be included in the electronic device 100. For example, components of an electronic device 302 shown in FIG. 3 may be applied to the components of the electronic device 100 shown in FIG. 2. For another example, at least some of components of an electronic device 901 of FIG. 9 may be included in the components of the electronic device 100. The electronic device 100 may correspond to the electronic device 302 of FIG. 3, an electronic device 401 of FIG. 4, and an electronic device 902 of FIG. 9.

According to certain embodiments of this disclosure, the coil 210 may support power transmission between the electronic device 100 and the external device 110. The coil 210 may provide a magnetic field according to a flow of an electric current. The electronic device 100 may transmit power to the external device 110 through the magnetic field provided by the coil 210. The electronic device 100 may provide an electric current in the external device 110 through the magnetic field provided in the electronic device 100, to charge a battery. To change power charged to the battery of the external device 110, the electronic device 100 may change a frequency belonging to a frequency band through the coil 210.

According to certain embodiments of this disclosure, the coil 210 may perform wireless power transmission while supporting data communication execution between the electronic device 100 and the external device 110. The electronic device 100 may perform first communication with the external device 110 through the coil 210. The electronic device 100 may perform second communication with the external device 110 through a separate antenna different from the coil 210.

According to certain embodiments of this disclosure, the electronic device 100 may utilize a first frequency band, for the purpose of power transmission via the coil 210. For example, the electronic device 100 may use a frequency of 120 kHz among a frequency band of 110 kHz to 148 kHz, for the purpose of power transmission to the external device 110 via the coil 210.

According to certain embodiments of this disclosure, the control circuit 220 may control operations of the electronic device 100. For example, by controlling an intensity of an electric current flowing in the coil 210, the control circuit 220 may control an intensity of a magnetic field provided in the coil 210. The control circuit 220 may be operably and/or electrically connected with the coil 210.

According to certain embodiments of this disclosure, the control circuit 220 may include at least one circuit. For example, the at least one circuit may include a communicating circuit 230 and a power transmitting circuit 240.

According to certain embodiments of this disclosure, the communicating circuit 230 may control an electrical signal (or data signal) obtained through the coil 210. The communicating circuit 230 may convert the electrical signal (or data signal) obtained through the coil 210, into data.

According to certain embodiments of this disclosure, the power transmitting circuit 240 may control the magnetic field provided through the coil 210. For example, the power transmitting circuit 240 may control an intensity, and a quantity, of the magnetic field provided by the coil 210.

Figure 3:
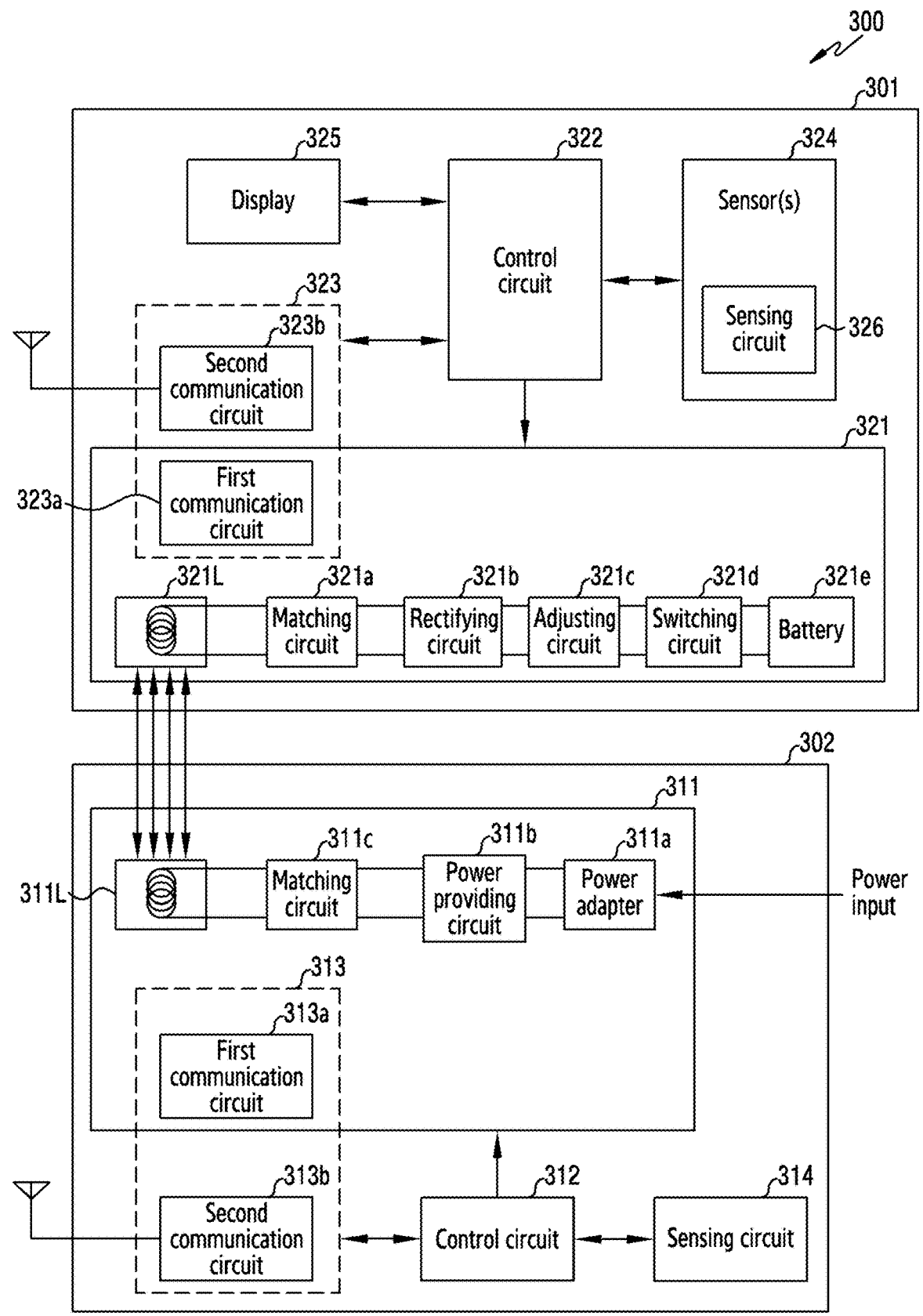
FIG. 3 illustrates an example of a wireless charging system 300 according to certain embodiments of this disclosure.

FIG. 3 illustrates an example of a wireless charging system 300 according to certain embodiments of this disclosure.

Referring to the illustrative example of FIG. 3, an electronic device 302 (e.g., the electronic device 100 of FIG. 1) may wirelessly supply power to an external device 301 (e.g., the external device 110 of FIG. 1). The electronic device 302 may be a wireless power transmitter, or an electronic device operating in a power transmission mode.

According to certain embodiments of this disclosure, the external device 301 may include not only a wireless power receiver, or an electronic device operating in a power reception mode, but also the wireless power transmitter, or the electronic device operating in the power transmission mode. For example, in response to the external device 301 corresponding to the wireless power transmitter, or the electronic device operating in the power transmission mode, the components of the electronic device 100 of FIG. 1, the electronic device 401 of FIG. 4, and the electronic device 902 of FIG. 9 may be applied to components of the external device 301.

According to certain embodiments of this disclosure, the electronic device 302 may include the same or similar construction with the electronic device 100 shown in FIG. 1. The external device 301 may include the same or similar construction with the external device 110 shown in FIG. 1.

According to certain embodiments of this disclosure, the electronic device 302 may be a power transmitting device capable of transmitting power to the external device 301, and the external device 301 may be a power receiving device receiving power from the electronic device 302.

According to certain embodiments of this disclosure, the electronic device 302 may include a power transmitting circuit 311, a control circuit 312, a communicating circuit 313, or a sensing circuit 314.

According to certain embodiments of this disclosure, the power transmitting circuit 311 may include a power adapter 311a for receiving a power source (or power) from the external and properly converting a voltage of the inputted power source, a power provision circuit 311b for providing power, or a matching circuit 311c for maximizing an efficiency between a transmitting coil 311L and a receiving coil 321L.

According to certain embodiments of this disclosure, the power transmitting circuit 311 may communicate with a first communicating circuit 323a of the external device 301 by using the same or adjacent frequency to a frequency which is used for power delivery in the transmitting coil 311L. The power transmitting circuit 311 may perform an operation corresponding to an operation of a first communicating circuit 313a described later.

According to certain embodiments of this disclosure, the power transmitting circuit 311 may include the first communicating circuit 313a described later, and communicate with the first communicating circuit 323a of the external device 301 through the first communicating circuit 313a.

According to certain embodiments of this disclosure, the electronic device 302 may include a separate communicating circuit in order to communicate with the external device 301 by using any one of various short-range communication schemes such as Bluetooth, Bluetooth low energy (BLE), Wi-Fi, and near field communication (NFC). The separate communicating circuit may correspond to, for example, a second communicating circuit 313b described later.

According to certain embodiments of this disclosure, the power transmitting circuit 311 may construct, in plural, at least some of the power adapter 311a, the power provision circuit 311b, the transmitting coil 311L, or the matching circuit 311c wherein power transmission to a plurality of power receiving devices (e.g., a first external device and a second external device) is possible.

According to certain embodiments of this disclosure, the control circuit 312 may perform the general control of the electronic device 302, and provide various messages necessary for wireless power transmission and deliver the provided messages to the communicating circuit 313.

According to certain embodiments of this disclosure, the control circuit 312 may calculate power (or a power value) to be sent out to the external device 301, on the basis of information received from the communicating circuit 313.

According to certain embodiments of this disclosure, the control circuit 312 may control the power transmitting circuit 311 wherein power provided by the transmitting coil 311L is transmitted to the external device 301.

According to certain embodiments of this disclosure, the communicating circuit 313 may include at least one of the first communicating circuit 313a or the second communicating circuit 313b. For example, the first communicating circuit 313a may communicate with the first communicating circuit 323a of the external device 301 by using the same or adjacent frequency to a frequency which is used for power delivery in the transmitting coil 311L. The electronic device 302 may perform data communication with the external device 301 through a magnetic field signal formed using a coil. For another example, the electronic device 302 may perform data communication with the external device 301 through the second communication (e.g., the out-band communication), by using a separate antenna, not a coil having applied a wireless power signal. According to certain embodiments of this disclosure, the first communicating circuit 313a may communicate with the first communicating circuit 323a by using the transmitting coil 311L. Data (or a communication signal) provided by the first communicating circuit 313a may be transmitted using the transmitting coil 311L. The first communicating circuit 313a may deliver data to the external device 301 by using a frequency shift keying (FSK) modulation scheme.

According to certain embodiments of this disclosure, the first communicating circuit 313a may communicate with the first communicating circuit 323a of the external device 301 by allowing a change of a frequency of a power signal delivered via the transmitting coil 311L. The first communicating circuit 313a may communicate with the first communicating circuit 323a of the external device 301 by allowing data to be included in a power signal provided in the power provision circuit 311b. For example, the first communicating circuit 313a may express the data by increasing or decreasing a frequency of a power transmission signal. For example, the first communicating circuit 313a may express the data by utilizing 110 kHz and 110.68 kHz as the frequency of the power transmission signal.

According to certain embodiments of this disclosure, the second communicating circuit 313b may communicate (e.g., out-band communication) with a second communicating circuit 323b of the external device 301 by using a frequency different from a frequency which is used for power delivery in the transmitting coil 311L. For example, the second communicating circuit 313b may obtain charging-state related information (e.g., a voltage value after a rectifier, a rectified voltage value (e.g., Vrect), electric current information (e.g., Iout) flowing in a coil or a rectifying circuit, various packets, a message, etc.) from the second communicating circuit 323b, by using any one of various short-range communication schemes such as BLUETOOTH®, BLUETOOTH® low energy (BLE), Wi-Fi, and near field communication (NFC).

According to certain embodiments of this disclosure, the sensing circuit 314 may include at least one or more sensors, and may sense at least one state of the power transmitting device 301 by using the at least one or more sensors.

According to certain embodiments of this disclosure, the sensing circuit 314 may include at least one of a temperature sensor, a motion sensor, or a current (or voltage) sensor. The sensing circuit 314 may sense a temperature state of the electronic device 302 by using the temperature sensor, and may sense a motion state of the electronic device 302 by using the motion sensor, and may sense a state (for example, a current amplitude, a voltage amplitude, or a power amplitude) of an output signal of the electronic device 302 by using the current (or voltage) sensor.

According to certain embodiments of this disclosure, the current (or voltage) sensor may measure a signal in the power transmitting circuit 311. The current (or voltage) sensor may measure a signal in at least partial region of the matching circuit 311c or the power provision circuit 311b. For example, the current (or voltage) sensor may include a circuit for measuring a signal in a stage before the coil 311L.

According to certain embodiments of this disclosure, the sensing circuit 314 may be a circuit for foreign object detection (FOD). The electronic device 302 may measure a current and a voltage in the power transmitting circuit 311 through the sensing circuit 314, and obtain an amplitude of power transmitted by the electronic device 302 on the basis of the measured current and voltage. In response to an external object existing between the electronic device 302 and the external device 301, an amplitude of a loss power that is a difference between power transmitted by the electronic device 302 and power received by the external device 301 may be increased. In response to the loss power exceeding a specified threshold, the electronic device 302 may stop power transmission.

According to certain embodiments of this disclosure, the sensing circuit 314 may sense a variation of the external device 301, by measuring a current and a voltage which are applied to the power transmitting circuit 311 (e.g., the power provision circuit 311b or the transmitting coil 311L) by the variation of the external device 301.

According to certain embodiments of this disclosure, the external device 301 (e.g., the external device 110 of FIG. 1) may include a power receiving circuit 321, a control circuit 322, a communicating circuit 323, at least one sensor 324, a display 325, or a sensing circuit 326. A description of a construction of the external device 301 corresponding to the electronic device 302 may be partially omitted.

According to certain embodiments of this disclosure, the external device 301 may correspond to a wireless power transmitter, or an electronic device which operates in a power transmission mode. In response to the external device 301 corresponding to the wireless power transmitter or the electronic device which operates in the power transmission mode, the external device 301 may include a component of the electronic device 302 necessary for power transmission.

According to certain embodiments of this disclosure, the power receiving circuit 321 may include the receiving coil 321L for wirelessly receiving power from the electronic device 302, a matching circuit 321a, a rectifying circuit 321b for rectifying received alternating current (AC) power to a direct current (DC), an adjusting circuit 321c for adjusting a charging voltage, a switching circuit 321d, or a battery 321e.

According to certain embodiments of this disclosure, the control circuit 322 may perform the general control of the external device 301, and provide various messages necessary for wireless power transmission and deliver the messages to the communicating circuit 323.

According to certain embodiments of this disclosure, the communicating circuit 323 may include at least one of the first communicating circuit 323a or the second communicating circuit 323b. The first communicating circuit 323a may communicate with the electronic device 302 via the receiving coil 321L.

According to certain embodiments of this disclosure, the first communicating circuit 323a may communicate with the first communicating circuit 313a by using the receiving coil 321L. Data (or a communication signal) provided by the first communicating circuit 323a may be transmitted using the receiving coil 321L. The first communicating circuit 323a may deliver data to the electronic device 302 by using an amplitude shift keying (ASK) modulation scheme. The second communicating circuit 323b may communicate with the electronic device 302 by using any one of various short-range communication schemes such as BLUETOOTH®, BLE, WI-FI, and NFC.

According to certain embodiments of this disclosure, at least one sensor 324 may include at least some of a current and/or voltage sensor, a temperature sensor, an illuminance sensor, or an acceleration sensor.

According to certain embodiments of this disclosure, the display 325 may display various display information necessary for wireless power transmission and/or reception.

According to certain embodiments of this disclosure, by sensing a search signal or a received power from the electronic device 302, the sensing circuit 326 may sense the electronic device 302. The sensing circuit 326 may sense a signal variation of an input and/or output stage of the coil 321L, the matching circuit 321a, or the rectifying circuit 321b, caused by a coil 321L signal provided by a signal outputted from the electronic device 302.

According to certain embodiments of this disclosure, the sensing circuit 326 may be included in the power receiving circuit 321.

Figure 4:
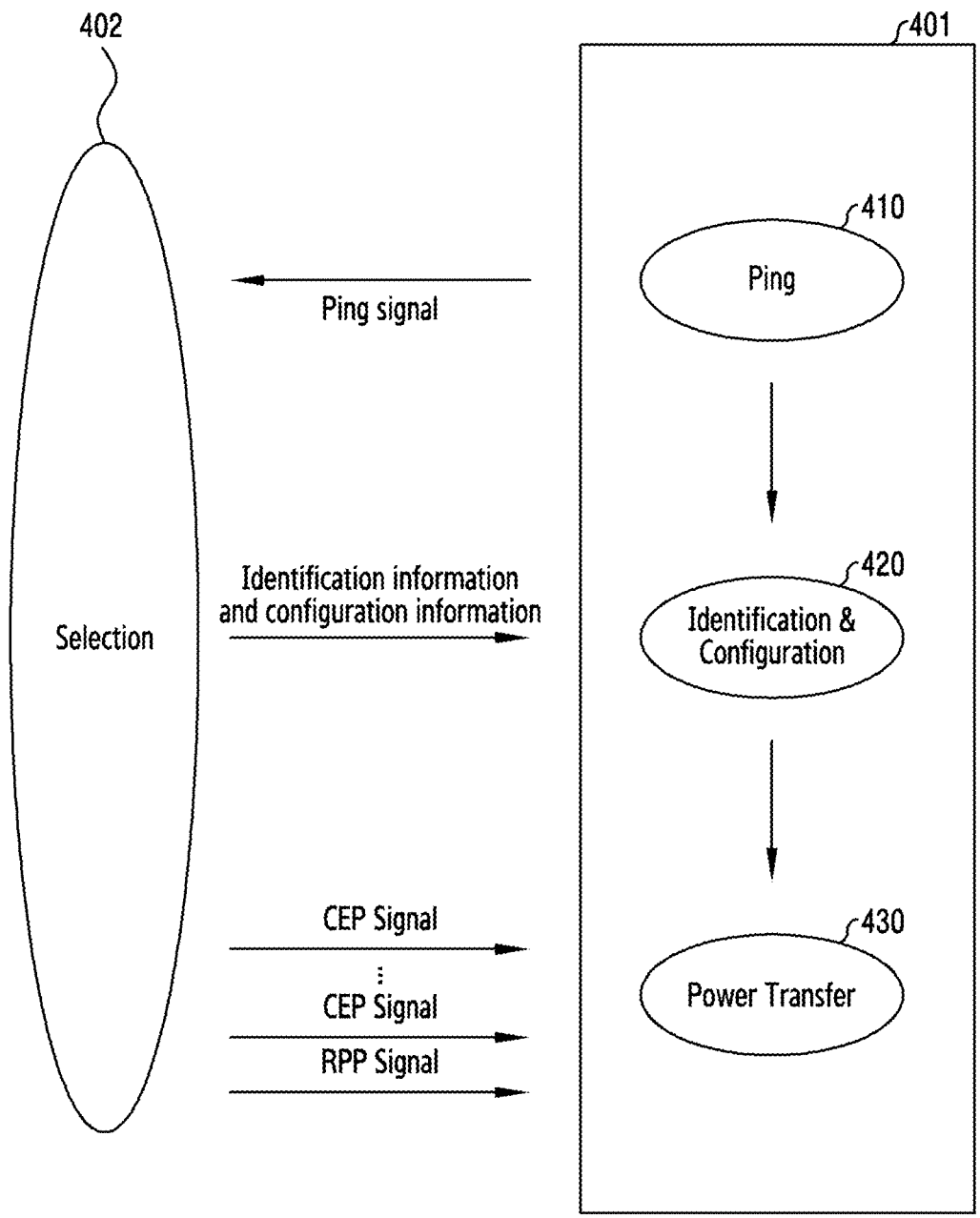
FIG. 4 illustrates an example of an operation mode of an electronic device 401 according to certain embodiments of this disclosure.

FIG. 4 illustrates an example of an operation mode of the electronic device 401 while wirelessly charging according to certain embodiments of this disclosure.

Referring to the illustrative example of FIG. 4, the electronic device 401 (for example, the electronic device 100 of FIG. 1 or the external device 301 of FIG. 3) may sense and authenticate an external device 402 (for example, the external device 110 of FIG. 2 or the external device 301 of FIG. 3). To present power to the external device 402, the electronic device 401 may transmit and/or receive and output at least one signal corresponding to a ping phase 410, an authentication phase (identification & configuration) 420, and/or a power transfer phase 430.

According to certain embodiments of this disclosure, the electronic device 401 may transmit a ping signal (e.g., a digital ping signal or an analog ping signal) in the ping phase 410. As the external device 402 receives the ping signal from the electronic device 401, the electronic device 401 may sense the external device 402.

According to certain embodiments of this disclosure, as the external device 402 is sensed, the electronic device 401 may receive identification information and configuration information for authenticating a power receiving device from the external device 402 in the authentication phase (identification & configuration) 420. The identification information may include information for identifying the external device 402. The configuration information may include various information necessary for the external device 402 to receive power.

According to certain embodiments of this disclosure, the electronic device 401 may authenticate the external device 402, on the basis of the identification information and the configuration information from the external device 402. As the authentication succeeds, the electronic device 401 may receive at least one or more control error packet (CEP) signals from the external device 402 in the power transfer phase 430, or receive at least one or more received power packet (RPP) signals from the external device 402. The CEP signal may include information which represents an amplitude of a transmit power transmitted by the electronic device 401 or a request for change of the transmit power. The RPP signal may include information which represents an amplitude of a receive power received by the external device 402. The electronic device 401 may adjust power outputted to the external device 402, on the basis of the CEP signal and the RPP signal.

Figure 5:
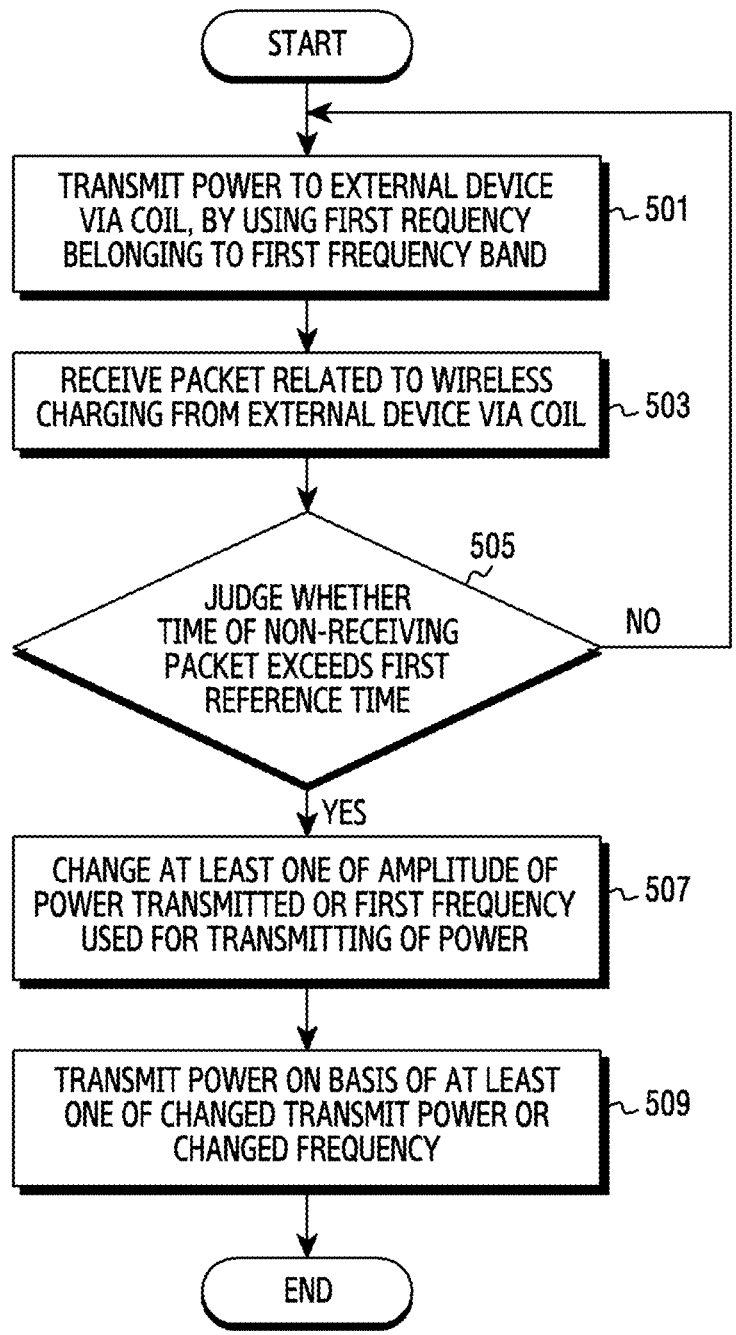
FIG. 5 illustrates an example of operations of a method which an electronic device changes at least one of power or a frequency, and transmits power to an external device according to certain embodiments of this disclosure.

FIG. 5 illustrates an example of operations of a method in which an electronic device changes at least one of power or a frequency and transmits power to an external device according to various embodiments of this disclosure.

A series of operations described below may be performed concurrently or may be performed in order changed, and some operations may be omitted or be added.

Referring to the illustrative example of operation 501, in certain embodiments of this disclosure, the electronic device 100 may transmit power to the external device 110 via the coil 210, by using a first frequency belonging to a first frequency band. For example, the electronic device 100 may transmit power to the external device 110 via the coil 210, by using a frequency of 115 kHz among a frequency band of 110 kHz to 148 kHz.

In operation 503 of certain embodiments of this disclosure, the electronic device 100 may receive a packet related with wireless charging, from the external device 110 via the coil 210. For example, the packet related with the wireless charging may include a CEP signal, an RPP signal, a signal related to a power level, or a signal related with foreign metal object detection. The CEP signal may include information which represents an amplitude of a transmit power transmitted by a wireless power transmitting device or a request for change of the transmit power. The RPP signal may include information which represents an amplitude of a receive power received by a wireless power receiving device. The electronic device 100 may receive the CEP signal or the RPP signal from the external device 110 via the coil 210.

In operation 505 of certain embodiments of this disclosure, the electronic device 100 may judge whether it has failed to receive a packet related with wireless charging within a first reference time. For example, a time interval of receiving the packet related with the wireless charging in a normal state is approximately 100 ms, and the first reference time may be 500 ms. For example, in response to the packet related with the wireless charging not being received while a time corresponding to the first reference time (e.g., 500 ms) goes, the electronic device 100 may perform operation 507.

According to certain embodiments of this disclosure, in response to having received the packet related with the wireless charging within the first reference time, the electronic device 100 may transmit power to the external device 110 via the coil 210 by using a first frequency belonging to a first frequency band, without changing at least one of the amplitude of the power (or voltage) transmitted or the first frequency used for the transmitting of the power, according to operation 501.

According to certain embodiments of this disclosure, in response to the packet related with wireless charging not having been received within the first reference time, in operation 507, the electronic device 100 may change at least one of the amplitude of the power (or voltage) transmitted or the first frequency used for the transmitting of the power.

According to certain embodiments of this disclosure, until the packet is received within the first reference time, the electronic device 100 may periodically or non-periodically change the at least one of the amplitude of the power (or voltage) or the first frequency used for the transmitting of the power. For example, until the packet is received within the first reference time, the electronic device 100 may increase or decrease the at least one of the amplitude of the power (or voltage) transmitted to the external device 110 or the first frequency used for the transmitting of the power. For another example, until the packet is received within the first reference time, the electronic device 100 may increase or decrease the amplitude of the power (or voltage) by 300 mV or may increase or decrease the first frequency by 5 kHz.

According to certain embodiments of this disclosure, the electronic device 100 may change the amplitude of the power (or voltage) periodically or non-periodically. For example, the electronic device 100 may increase or decrease the amplitude of the power (or voltage) periodically once every 500 ms. For another example, in response to a user input, the electronic device 100 may increase or decrease the amplitude of the power (or voltage).

According to certain embodiments of this disclosure, in response to the packet not having been received within the first reference time, the electronic device 100 may change the amplitude of the power (or voltage) transmitted or the first frequency used for the transmitting of the power. For example, in response to the packet not having been received within the first reference time, the electronic device 100 may increase the amplitude of the power by 300 mV and concurrently, decrease the first frequency from 127 kHz to 110 kHz.

According to certain embodiments of this disclosure, in operation 509, the electronic device 100 may transmit power on the basis of at least one of the changed transmit power or the changed frequency. For example, the electronic device 100 may transmit power to the external device 110 on the basis of the amplitude of the power (or voltage) increased by 300 mV. For another example, the electronic device 100 may transmit power to the external device 110 on the basis of the frequency increased by 5 kHz.

According to certain embodiments of this disclosure, the electronic device 100 may change an impedance of the electronic device 100 on the basis of the at least one of the changed transmit power or the changed frequency. The electronic device 100 may transmit power to the external device 110 on the basis of the changed impedance.

According to certain embodiments of this disclosure, the electronic device 100 may transmit power to the external device 110, on the basis of the changed transmit power and the changed frequency. For example, the electronic device 100 may transmit power to the external device 110, on the basis of the amplitude of the power (or voltage) decreased by 300 mV and the frequency increased by 5 kHz.

Figure 6:
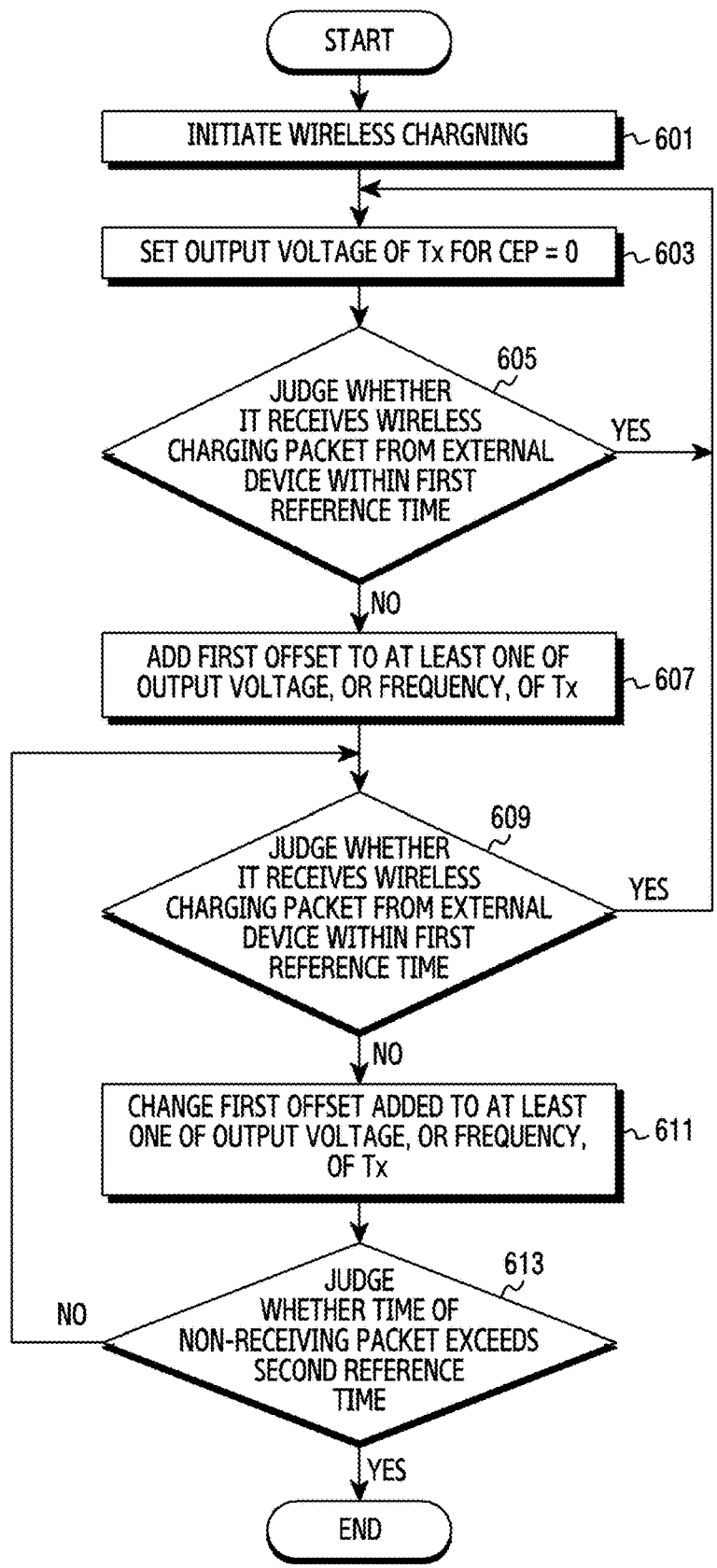
FIG. 6 illustrates an example of an algorithm applied to an electronic device 100 according to certain embodiments of this disclosure.

FIG. 6 illustrates an example of an algorithm applied to the electronic device 100 according to certain embodiments of this disclosure.

A series of operations described below may be performed concurrently or be performed in order changed, and some operations may be omitted or be added.

Referring to the non-limiting example of FIG. 6, at operation 601 of certain embodiments of this disclosure, the electronic device 100 may transmit wireless power to the external device 110, to perform wireless charging. For example, the electronic device 100 may perform wireless power transmission to the external device 110 by using a magnetic field provided through the coil 210. In response to transmitting power to the external device 110, the electronic device 100 may receive a CEP signal from the external device 110.

In operation 603 of certain embodiments of this disclosure, in response to the electronic device 100 having received the CEP signal from the external device 110, the electronic device 100 may set an output voltage of Tx, wherein a CEP value becomes 0. Tx may be understood to be a wireless power transmitting device (e.g., the electronic device 100 of FIG. 1, the electronic device 302 of FIG. 3, or the electronic device 401 of FIG. 4). The electronic device 100 may change the output voltage of Tx according to a symbol of the CEP value. For example, when the CEP value is equal to 0, it may be understood as a stable state in which there is not a need to change the output voltage of Tx. When the CEP value is equal to a positive number, it may be understood as a state in which there is a need to increase the output voltage of Tx. When the CEP value is equal to a negative number, it may be understood as a state in which there is a need to decrease the output voltage of Tx.

In operation 605 of certain embodiments of this disclosure, after transmitting wireless power to the external device 110, the electronic device 100 may judge whether it receives a wireless charging packet from the external device 110 within a first reference time (e.g., 500 ms). The wireless charging packet may be understood to be a packet related with wireless charging. In response to having received the wireless charging packet from the external device 110 within the first reference time, the electronic device 100 may perform operation 603, and in response to having failed to receive the wireless charging packet from the external device 110 within the first reference time, the electronic device 100 may perform operation 607. For example, in response to the first reference time being 500 ms, and the electronic device 100 having received the wireless charging packet from the external device 110 at 100 ms after transmitting the wireless power, the electronic device 100 may transmit wireless power to the external device 110 on the basis of the output voltage of Tx in which the CEP value becomes 0 according to operation 603.

According to certain embodiments of this disclosure, in response to the electronic device 100 having received the wireless charging packet from the external device 110 within the first reference time, the electronic device 100 may maintain the output voltage of Tx wherein the CEP value becomes 0, according to operation 603.

In operation 607 of certain embodiments of this disclosure, in response to the electronic device 100 having failed to receive the wireless charging packet from the external device 110 within the first reference time, the electronic device 100 may add a first offset to at least one of the output voltage, or a frequency, of Tx. For example, in response to the electronic device 100 having failed to receive the wireless charging packet from the external device 110 within the first reference time, the electronic device 100 may increase 300 mV corresponding to the first offset to the output voltage of Tx, or decrease a frequency (e.g., 5 kHz) corresponding to the first offset from the frequency of Tx. An amplitude of the changed voltage and an amplitude of the changed frequency may not be limited to the aforementioned example. For another example, in response to the electronic device 100 having failed to receive the wireless charging packet from the external device 110 within the first reference time, the electronic device 100 may decrease the output voltage of Tx by 300 mV corresponding to the first offset from the output voltage of Tx, or increase the frequency (e.g., 5 kHz) corresponding to the first offset to the frequency of Tx. The amplitude of the changed voltage and the amplitude of the changed frequency may not be limited to the aforementioned example.

In operation 609 of certain embodiments of this disclosure, after having added the first offset to the at least one of the output voltage, or the frequency, of Tx (operation 607), the electronic device 100 may again judge whether it receives the wireless charging packet from the external device 110 within the first reference time. In response to having received the wireless charging packet from the external device 110 within the first reference time, the electronic device 100 may perform operation 603, and in response to having failed to receive the wireless charging packet from the external device 110 within the first reference time, the electronic device 100 may perform operation 611. According to certain embodiments of this disclosure, after having added the first offset to the at least one of the output voltage, or the frequency, of Tx, in response to the electronic device 100 having received the wireless charging packet from the external device 110 within the first reference time, the electronic device 100 may reset an amplitude of the changed output voltage or the changed frequency. The resetting may be referred to as operation of changing the output voltage or the frequency wherein the CEP value becomes 0. For example, after having added 300 mV to the output voltage of Tx or having decreased 5 kHz from the frequency of Tx, the electronic device 100 may judge whether it receives the wireless charging packet from the external device 110 within the first reference time. In response to the electronic device 100 receiving the wireless charging packet within the first reference time, in operation 603, the electronic device 100 may set the changed output voltage in which the CEP value becomes 0. For another example, after having decreased 300 mV from the output voltage of Tx or having added 5 kHz to the frequency of Tx, the electronic device 100 may judge whether it receives the wireless charging packet from the external device 110 within the first reference time. In response to the electronic device 100 receiving the wireless charging packet within the first reference time, in operation 603, the electronic device 100 may set the changed output voltage in which the CEP value becomes 0. In operation 611 of certain embodiments of this disclosure, the electronic device 100 may change the first offset added to the at least one of the output voltage, or the frequency, of Tx.

According to certain embodiments of this disclosure, in response to having failed to receive the wireless charging packet within the first reference time, in operation 611, the electronic device 100 may change the first offset added to the at least one of the output voltage, or the frequency, of Tx. For example, after having added the first offset to the at least one of the output voltage, or the frequency, of Tx, in response to having failed to receive the wireless charging packet from the external device 110 within the first reference time, the electronic device 100 may add 300 mV to an amplitude of the output voltage corresponding to the added first offset or decrease 5 kHz from the frequency corresponding to the added first offset. For another example, after having added the first offset to the at least one of the output voltage, or the frequency, of Tx, in response to having failed to receive the wireless charging packet from the external device 110 within the first reference time, the electronic device 100 may decrease 300 mV from the amplitude of the output voltage corresponding to the added first offset or add 5 kHz to the frequency of Tx. According to various embodiments, the electronic device 100 may add, and/or change, the first offset concurrently to the output voltage, and the frequency, of Tx, without being limited to operation of adding, and/or changing, the first offset to the at least one of the output voltage, or the frequency, of Tx.

In operation 613 of certain embodiments of this disclosure, the electronic device 100 may judge whether a time of an unreceived packet exceeds a second reference time. The second reference time may be understood to be a time for judging a packet timeout and a wireless charging end. In response to the time of the unreceived packet exceeding the second reference time, the electronic device 100 may terminate wireless charging. In response to the time of the failure to receive the packet not exceeding the second reference time, the electronic device 100 may perform operation 607. For example, in response to a time of the failure to receive the packet related with wireless charging exceeding 1.7 s which corresponds to the second reference time, the electronic device 100 may terminate the wireless charging. In response to the time of the failure to receive the packet related with the wireless charging not exceeding 1.7 s which corresponds to the second reference time, in operation 607, the electronic device 100 may again add the first offset to the at least one of the output voltage, or the frequency, of Tx.

Figure 7A:
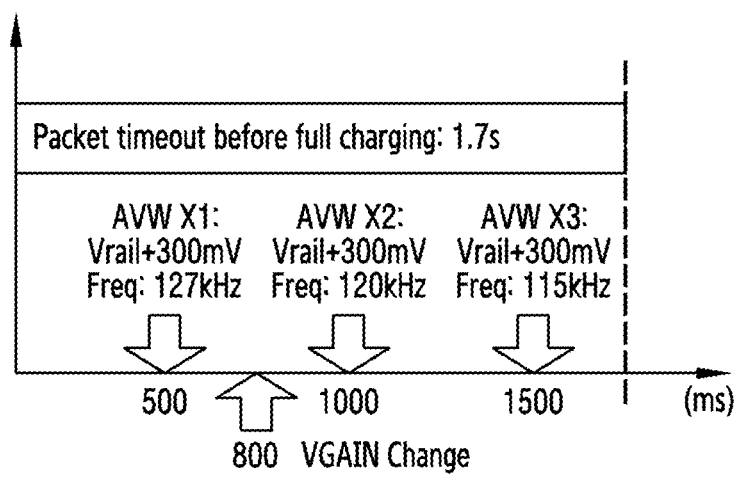
FIG. 7A illustrates an example of a packet timeout before full charging according to certain embodiments of this disclosure.
Figure 7B:
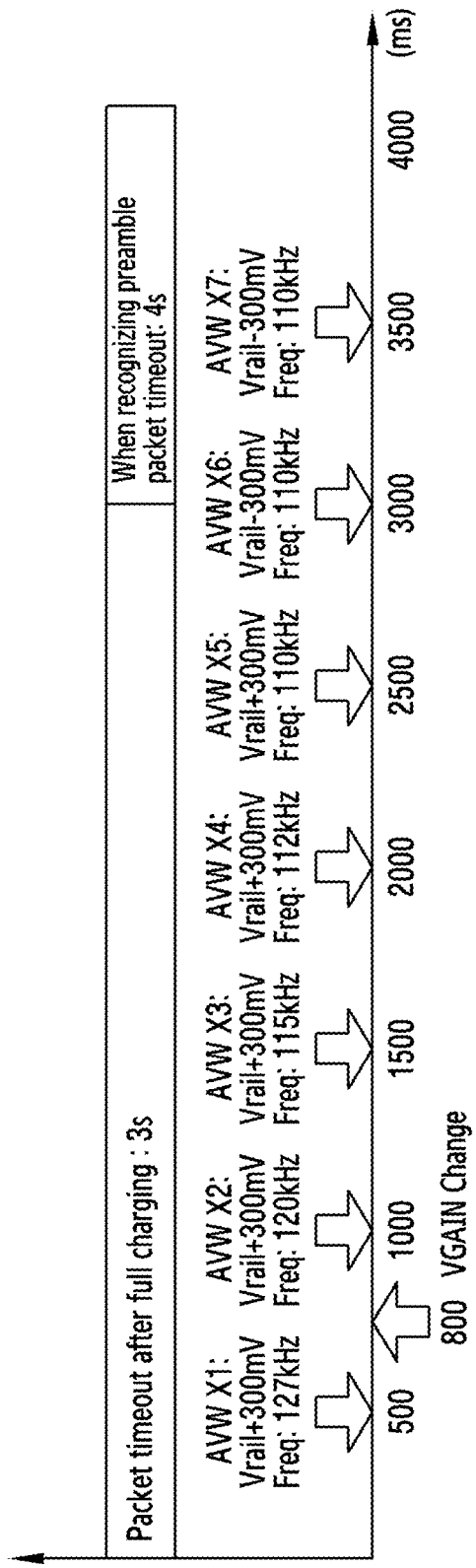
FIG. 7B illustrates an example of a packet timeout after full charging according to certain embodiments of this disclosure.

FIG. 7A and FIG. 7B illustrate an example of an algorithm applied to the electronic device 100 according to certain embodiments of this disclosure.

Below, a description is made for the definition of the algorithm applied to the electronic device 100 for the purpose of wireless charging breaking prevention.

According to certain embodiments of this disclosure, when a first communication (e.g., in-band communication) environment is deteriorated according to a load condition of the external device 110, the algorithm may be applied to the electronic device 100, to prevent wireless charging breaking resulting from the non-receiving of a packet related with wireless charging. When the electronic device 100 fails to receive the packet, the electronic device 100 may apply the algorithm, to change at least one of an amplitude of a voltage (or power), or a frequency, of the electronic device 100 by the unit of a reference time (e.g., the unit of 500 ms) and thus improve the first communication environment. An x axis of FIG. 7A and FIG. 7B may be referred to as a time from when the electronic device 100 transmits power to the external device 110 to when the electronic device 100 receives a wireless charging packet from the external device 110.

Referring to the illustrative examples of FIG. 7A and FIG. 7B, when the electronic device 100 fails to receive the packet, the electronic device 100 may apply the algorithm, to change and increase VGAIN of VSNS after 800 ms and thus improve the first communication (e.g., in-band communication) environment to improve the likelihood of receiving the packet, through VSNS whose amplitude is small. The change of VSNS may be referred to as changing an internal gain of at least one of a comparator, or an operational amplifier (OP-AMP), of Tx. VSNS may be understood to be an index indicating a signal quality (or reliability). VGAIN may be understood to indicate a numerical value related with signal amplification.

FIG. 7A illustrates an example of a packet timeout before full charging according to certain embodiments of this disclosure.

According to certain embodiments of this disclosure, a packet timeout before the full charging of a battery of the external device 110 may be 1.7 s. The packet timeout may be understood as a reference time for ending wireless charging. For example, in response to having received a packet related with wireless charging from the external device 110 during the packet timeout of 1.7 s, the electronic device 100 may perform the wireless charging. In response to having failed to receive the packet within the packet timeout of 1.7 s, the electronic device 100 may stop the wireless charging.

According to certain embodiments of this disclosure, the electronic device 100 may judge whether it receives a wireless charging packet from the external device 110 within a packet timeout (e.g., 1.7 s) before the full charging of the battery of the external device 110. In response to having failed to receive the wireless charging packet from the external device 110, the electronic device 100 may apply the algorithm. On the basis of the algorithm applying, the electronic device 100 may change at least one of a supply voltage, or a frequency, of the electronic device 100 at each reference time (e.g., 500 ms) from after having transmitted power to the external device 110. For example, in response to the electronic device 100 having failed to receive the wireless charging packet from the external device 110 within the packet timeout (e.g., 1.7 s) before the full charging, the electronic device 100 may, at 500 ms (X1), add a supply voltage by 300 mV, and set a frequency to 127 kHz. In another illustrative example, in response to the electronic device 100 having failed to receive the wireless charging packet from the external device 110 within the packet timeout (e.g., 1.7 s) before the full charging, the electronic device 100 may, at 1000 ms (X2), add the supply voltage by 300 mV, and set the frequency to 120 kHz. Below, the added supply voltage value 300 mV mentioned is merely an example and various values may be applied.

According to certain embodiments of this disclosure, in response to the electronic device 100 having failed to receive the wireless charging packet from the external device 110 within the packet timeout (e.g., 1.7 s) before the full charging, the electronic device 100 may, at 800 ms, change VGAIN of an internal circuit (e.g., a comparator or an operational amplifier (OP-AMP)) of Tx.

According to certain embodiments of this disclosure, a change of a supply voltage of the electronic device 100 may result in a change of an output voltage or a change of a transmit power.

FIG. 7B illustrates an example of a packet timeout after full charging according to certain embodiments of this disclosure. According to certain embodiments of this disclosure, a packet timeout after the full charging of a battery of the external device 110 may be 3 s. For example, after the external device 110 is fully charged, in response to the electronic device 100 having received a packet related with wireless charging from the external device 110 within the packet timeout of 3 s, the electronic device 100 may perform the wireless charging. In response to having failed to receive the packet within the packet timeout of 3 s, the electronic device 100 may stop the wireless charging.

According to certain embodiments of this disclosure, the electronic device 100 may judge whether it receives a wireless charging packet from the external device 110 within the packet timeout (e.g., 3 s) before the full charging of the battery of the external device 110. In response to having failed to receive the wireless charging packet from the external device 110, the electronic device 100 may apply the algorithm. On the basis of the algorithm applying, the electronic device 100 may change at least one of a supply voltage, or a frequency, of the electronic device 100 at each reference time (e.g., 500 ms) from after having transmitted power to the external device 110. For example, in response to the electronic device 100 having failed to receive the wireless charging packet from the external device 110 within the packet timeout (e.g., 3 s) before the full charging, the electronic device 100 may, at 2000 ms (X4), add a supply voltage by 300 mV, and set a frequency to 112 kHz. For another example, the electronic device 100 may, at 3000 ms (X6), decrease the supply voltage by 300 mV, and set the frequency to 110 kHz.

According to certain embodiments of this disclosure, when the external device 110 recognizes a preamble, a packet timeout may be 4 s. For example, after the external device 110 recognize the preamble, in response to the electronic device 100 having received a packet related with wireless charging from the external device 110 within the packet timeout of 4 s, the electronic device 100 may maintain the wireless charging. In response to having failed to receive within the packet timeout of 4 s, the electronic device 100 may stop the wireless charging. The preamble may be understood as a component of the packet related with the wireless charging.

TABLE 1

| Ex) | Vbridge/Frequency | X1 | X2 | X3 | X4 | X5 | X6 | X7 |
|---|---|---|---|---|---|---|---|---|
| Positive | 6800/127 kHz | 7100/127 kHz | 7400/120 kHz | 7700/115 kHz | 8000/112 kHz | 8300/110 kHz | 8000/110 kHz | 7700/110 kHz |
| Negative 1 | 9000/127 kHz | 8700/127 kHz | 8400/120 kHz | 8100/115 kHz | 7800/112 kHz | 7500/110 kHz | 7800/110 kHz | 8100/110 kHz |
| Negative 2 | 5500/127 kHz | 5200/127 kHz | 4900/120 kHz | 5200/115 kHz | 5500/112 kHz | 5800/110 kHz | 6100/110 kHz | 6400/110 kHz |

According to certain embodiments of this disclosure, Table 1 may show a concrete example of the algorithm applied to the electronic device 100. According to certain embodiments of this disclosure, when the algorithm is applied to the electronic device 100, the electronic device 100 may change a supply voltage (Vrail) value of the electronic device 100 by a symbol of a CEP value recognized lastly. For example, when the algorithm is applied to the electronic device 100, in response to the symbol of the CEP value recognized lastly by the electronic device 100 being positive, the electronic device 100 may increase the supply voltage (Vrail) value of the electronic device 100. For another example, in response to the symbol of the CEP value recognized lastly by the electronic device 100 being negative, the electronic device 100 may decrease the supply voltage (Vrail) value of the electronic device 100.

According to certain embodiments of this disclosure, when the algorithm is applied to the electronic device 100, in response to a supply voltage value having been changed as much as a first reference value (e.g., 1500 mV) or more in comparison with the first supply voltage (Vrail) value, the electronic device 100 may change the supply voltage value into a supply voltage value of an opposite symbol. For example, referring to a row of positive of Table 1, in response to a supply voltage value having been changed from X1 to X5 as much as 1500 mV, the electronic device 100 may change a supply voltage value (+300 mV) of X5 into a supply voltage value (−300 mV) of X6. In response to the change of the supply voltage value, the electronic device 100 may change an output voltage value from 8,300 mV of X5 to 8,000 mV of X6. For another example, referring to the example of Table 1, and the row marked "negative 1", in response to a supply voltage value having been changed from X1 to X5 as much as 1,500 mV, the electronic device 100 may change a supply voltage value (−300 mV) of X5 into a supply voltage value (+300 mV) of X6. In response to the change of the supply voltage value, the electronic device 100 may change an output voltage value from 7,500 mV of X5 to 7,800 mV of X6.

According to certain embodiments of this disclosure, when operating the algorithm at a second reference value (e.g., 5V) being an output voltage value of the electronic device 100 or less, the electronic device 100 may change a supply voltage value corresponding to when being the second reference value or more, into a supply voltage value of an opposite symbol, to operate the algorithm. For example, referring to the example of Table 1, and the row marked "negative 2", when an output voltage value (4.9V) of X2 is equal to or is less than the second reference value (e.g., 5V), the electronic device 100 may change a supply voltage value −300 mV of X2 into +300 mV from X3, to operate the algorithm. On the basis of the operation of the algorithm, the electronic device 100 may set an output voltage of X3 to 5,200 mV.

Figure 8A:
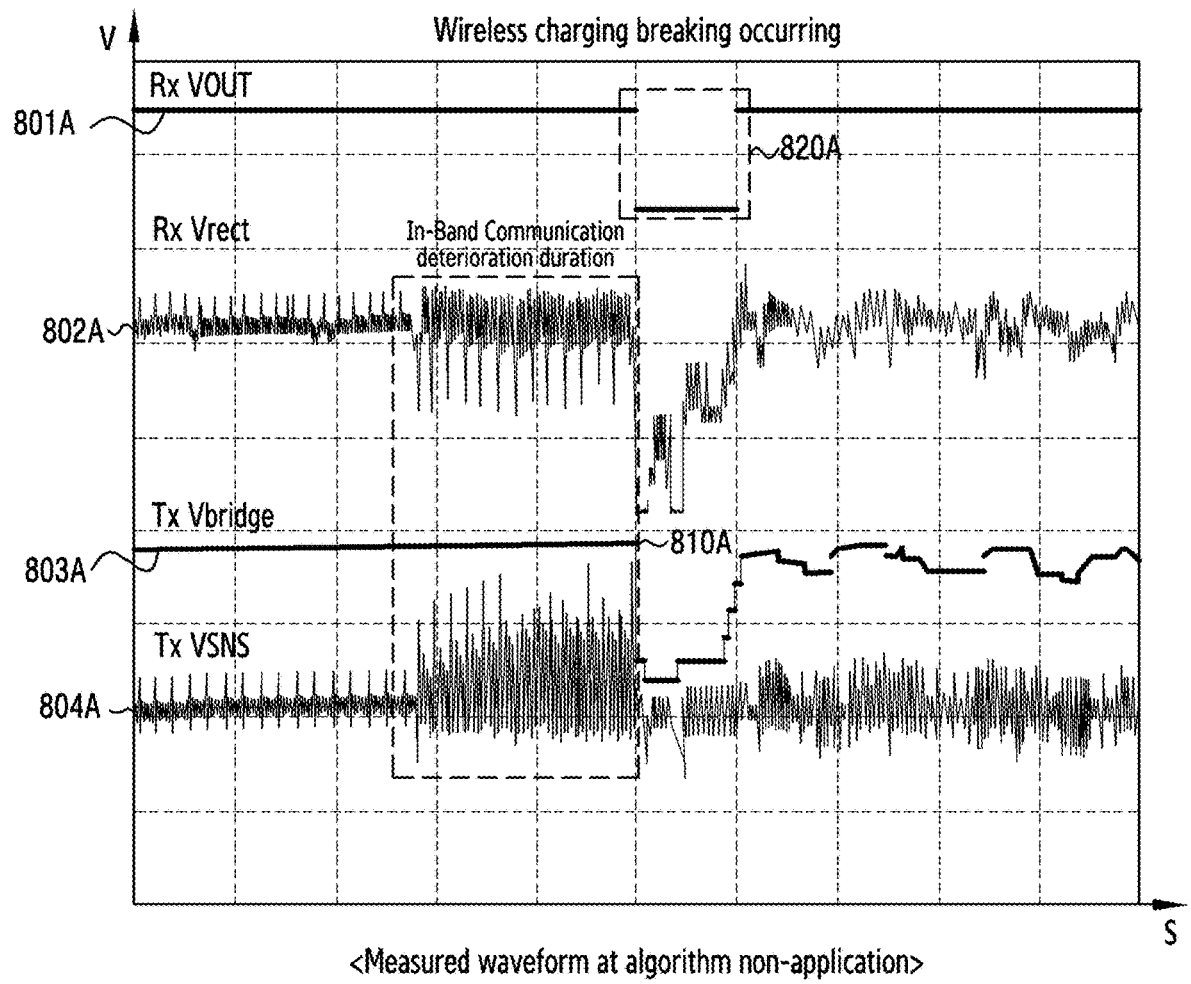
FIG. 8A illustrates an example of a waveform, shown at wireless power transmission, dependent on algorithm non-application according to certain embodiments of this disclosure.

FIG. 8A illustrates an example of a waveform, shown at wireless power transmission, dependent on algorithm non-application according to certain embodiments of this disclosure.

According to certain embodiments of this disclosure, the graph shown in the example of FIG. 8A represents a waveform shown when the algorithm has not been applied. In this example, "Tx" refers to a wireless power transmitting device, and "Rx" refers to a wireless power receiving device. In this example, Rx VOUT (801A, 801B, and 801C) represents an output voltage value of the external device 110 (e.g., the wireless power receiving device). Similarly, Tx Vbridge (803A, 803B, and 803C) represents an output voltage value of the electronic device 100. Here, Tx VSNS (804A, 804B, and 804C) represents a signal quality (or reliability) of an output voltage of the electronic device 100. In this example, Rx Vrect (802A, 802B, and 802C) represents a voltage value which is introduced into a rectifier of the external device 110.

According to certain embodiments of this disclosure, graphs 802A and 804A included in a region 810A may represent graphs in which a noise has been provided, and may represent a duration in which in-band communication has been deteriorated. Rx VOUT (801A) included in a region 820A may represent a ground level, and may represent a duration in which wireless charging breaking has been provided.

According to certain embodiments of this disclosure, wireless charging breaking (region 820A) may be provided, in response to the electronic device 100 having failed to receive a packet related with wireless charging from the external device 110 within a first reference time because of the deterioration (region 810A) of first communication (e.g., in-band communication) during wireless charging.

Figure 8B:
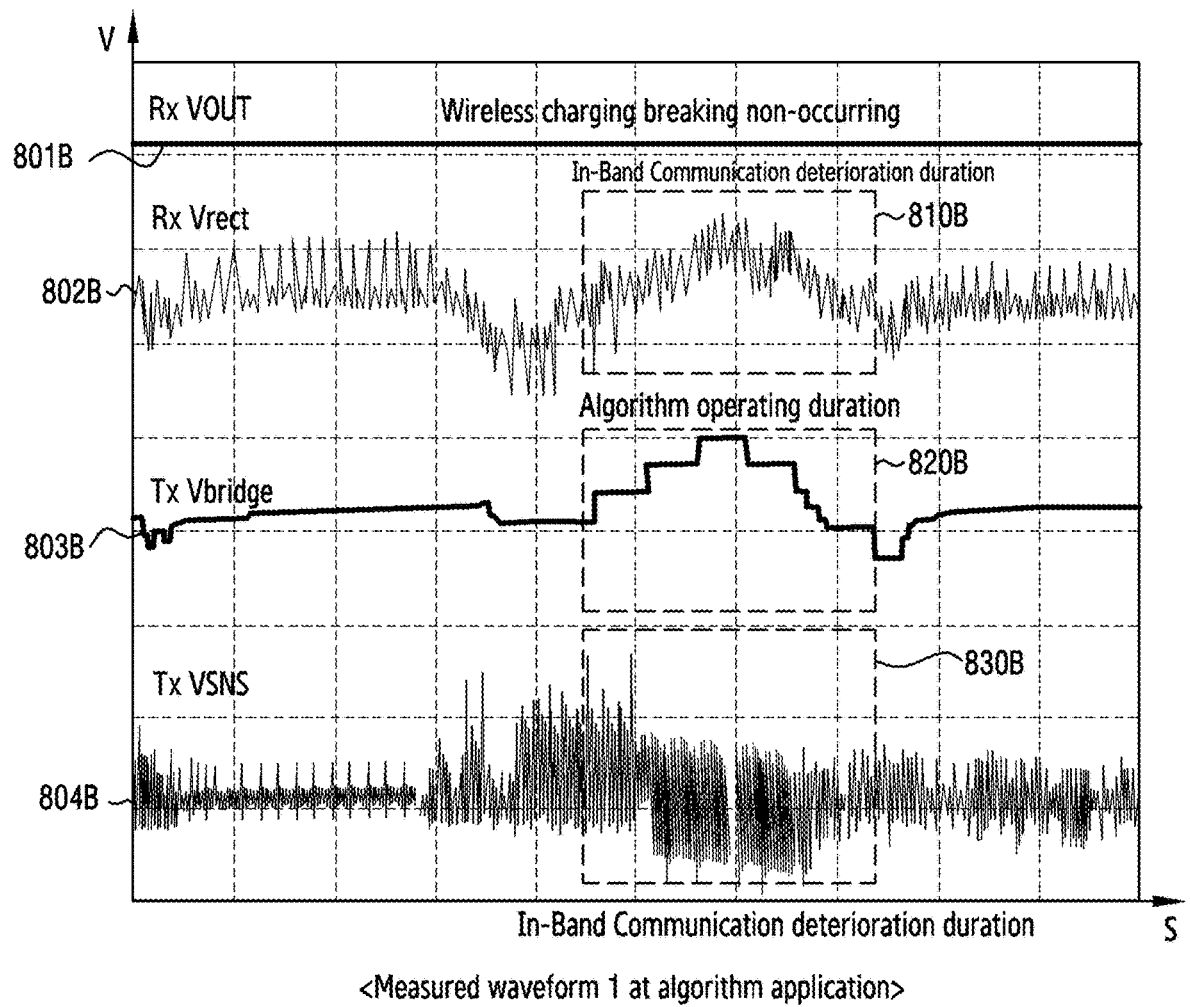
FIG. 8B illustrates an example of a first waveform, shown at wireless power transmission, dependent on algorithm application according to certain embodiments of this disclosure.

FIG. 8B illustrates an example of first waveform, shown at wireless power transmission, which is dependent on algorithm application according to certain embodiments of this disclosure.

According to certain embodiments of this disclosure, the graph shown in the illustrative example of FIG. 8B represents a first waveform shown when the algorithm has been applied. In this example, the graph included in the region 820B represents a graph in which a supply voltage value is increased and then decreased, as in the row of positive of Table 1 of FIG. 7. In the illustrative example of FIG. 8B, graphs (802B and 804B) included in a region 810B and a region 830B represent graphs in which a noise has been provided, and a duration in which in-band communication has been deteriorated. In response to the algorithm having been applied to the electronic device 100, breaking may not be provided in a graph of Rx VOUT (801B), and the electronic device 100 may perform wireless power transmission to the external device 110 without wireless charging breaking.

Figure 8C:
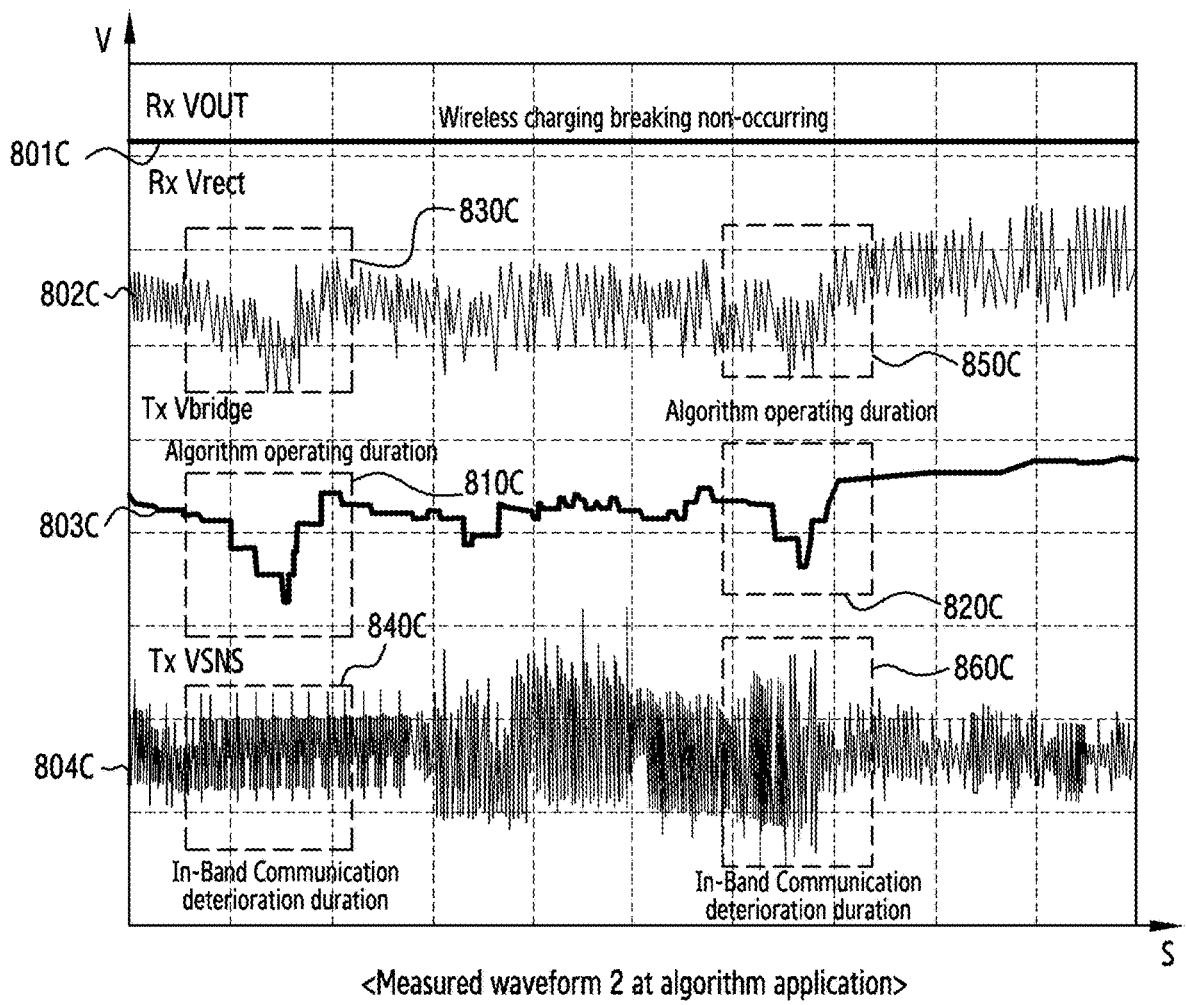
FIG. 8C illustrates an example of a second waveform, shown at wireless power transmission, dependent on algorithm application according to certain embodiments of this disclosure.

FIG. 8C illustrates an example of a second waveform, shown at wireless power transmission, dependent on algorithm application according to certain embodiments of this disclosure.

According to certain embodiments of this disclosure, the graph shown in the non-limiting example of FIG. 8C represents a second waveform obtained when the algorithm has been applied. Here, the graphs included in region 810C and region 820C represent graphs in which a supply voltage value is decreased and then increased, as in the row of negative of Table 1 of FIG. 7. In this illustrative example, included in regions 830C and 840C and regions 850C and 860C represent graphs 802C and 804C in which a noise has been provided, and represent a duration in which in-band communication has deteriorated. In response to the algorithm having been applied to the electronic device 100, breaking may not be provided in a graph of Rx VOUT (801C), and the electronic device 100 may perform wireless power transmission to the external device 110 without wireless charging breaking.

Figure 8D:
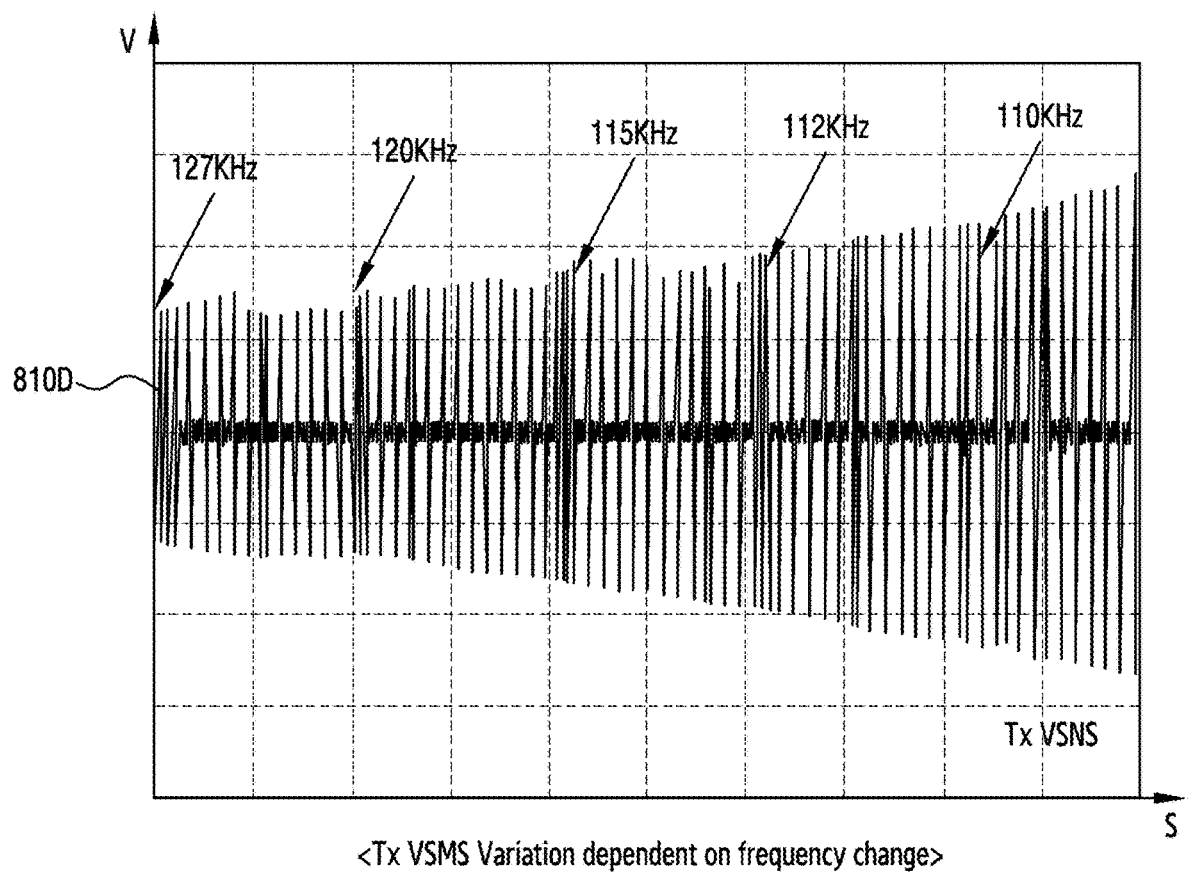
FIG. 8D illustrates an example of a waveform, shown at wireless power transmission, dependent on a frequency change according to certain embodiments of this disclosure.

FIG. 8D illustrates an example of a waveform, shown at wireless power transmission, which is dependent on a frequency change according to certain embodiments of this disclosure.

According to certain embodiments of this disclosure, a graph shown in the illustrative example of FIG. 8D represents a waveform variation of Tx VSNS shown according to a frequency change when the algorithm has been applied. In response to the electronic device 100 having failed to receive a packet related with wireless charging within a first reference time, the electronic device 100 may apply the algorithm, and may change a frequency as in a graph of FIG. 8D. For example, the electronic device 100 may apply the algorithm, and may change the frequency of the electronic device 100 into 127 kHz, 120 kHz, 115 kHz, 112 kHz, and 110 kHz. As the frequency value is decreased, an amplitude of a Tx VSNS signal may be increased. The changed frequency values may not be limited to the aforementioned example.

According to various embodiments disclosed in the present document, the electronic device may prevent wireless charging breaking by improving an environment to improve the likelihood of receiving a packet related with wireless power transmission, capable of being provided when an in-band communication environment has been deteriorated.

Besides this, various effects taken directly or indirectly through the present document may be presented.

Figure 9:
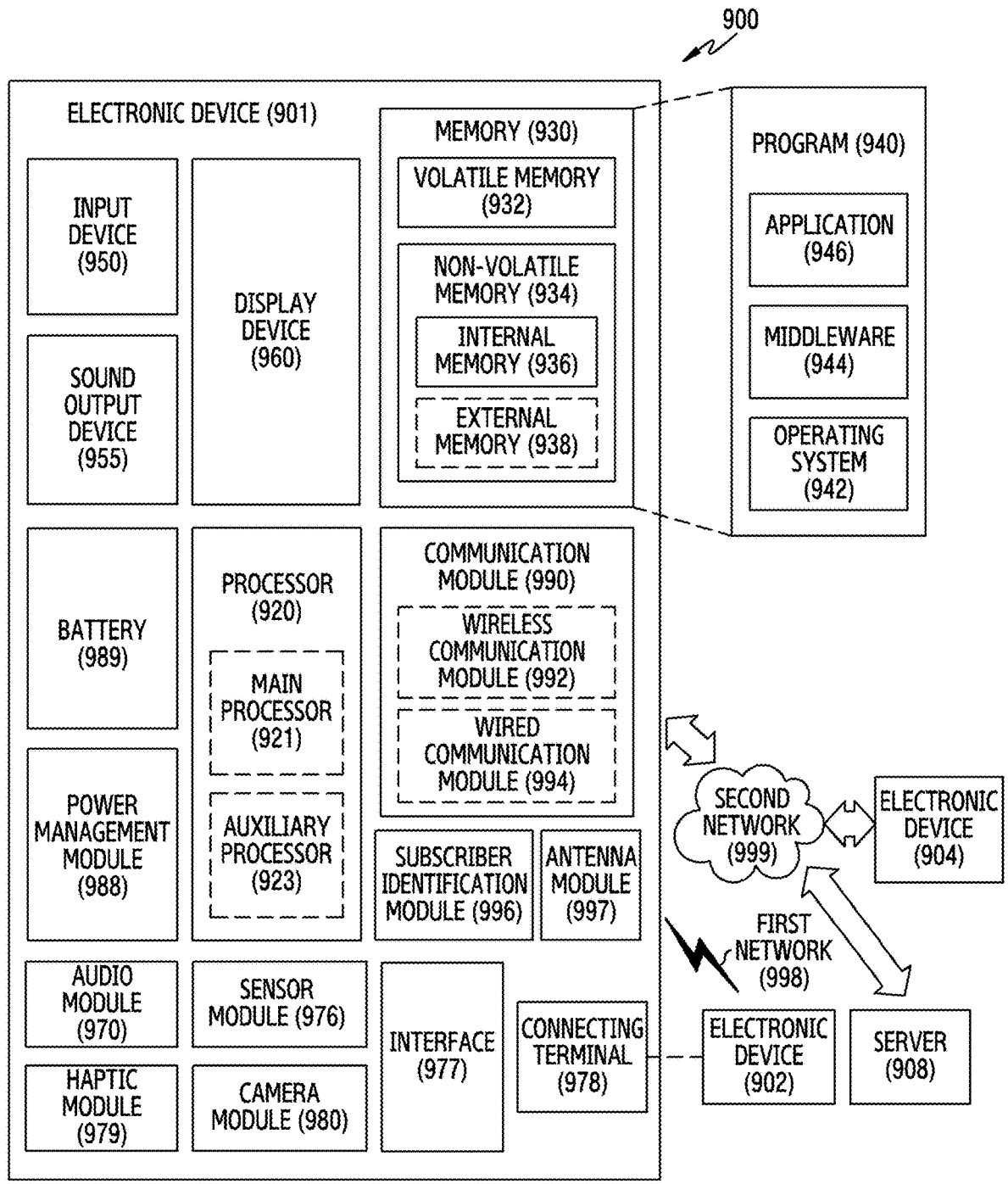
FIG. 9 illustrates in block diagram format, an example of an electronic device 901 within a network environment 900 according to certain embodiments of this disclosure.

FIG. 9 illustrates, in block diagram format, an example of an electronic device 901 in a network environment 900 according to various embodiments. Referring to the illustrative example of FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to certain embodiments of this disclosure, the electronic device 901 may communicate with the electronic device 904 via the server 908. According to certain embodiments of this disclosure, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to certain embodiments of this disclosure, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to certain embodiments of this disclosure, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to certain embodiments of this disclosure, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to certain embodiments of this disclosure, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to certain embodiments of this disclosure, the audio module 970 may obtain the sound via the input device 950, or output the sound via the sound output device 955 or a headphone of an external electronic device (e.g., an electronic device 902) directly (e.g., through a wire) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to certain embodiments of this disclosure, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (for example, through a cable) or wirelessly. According to certain embodiments of this disclosure, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to certain embodiments of this disclosure, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to certain embodiments of this disclosure, the haptic module 979 may include, for example, a motor, a piezoelectric element, or an electric stimulator.

The camera module 980 may capture a still image or moving images. According to certain embodiments of this disclosure, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to certain embodiments of this disclosure, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to certain embodiments of this disclosure, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as BLUETOOTH®, wireless-fidelity (WI-FI) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to certain embodiments of this disclosure, the antenna module 997 may include an antenna including a radiating element composed of a conductive material or a conductive pattern formed in or on a substrate (e.g., PCB). According to certain embodiments of this disclosure, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to certain embodiments of this disclosure, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to certain embodiments of this disclosure, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to certain embodiments of this disclosure, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to certain embodiments of this disclosure of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by a wire), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to certain embodiments of this disclosure, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to certain embodiments of this disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a coil;

a power provision circuit for providing power to an external device; and
at least one control circuit electrically connected to the coil and the power provision circuit;
wherein the at least one control circuit is configured to:
 authenticate the external device for a transmission of power to the external device;
 transmit, based on the authentication of the external device, power to the external device via the coil by using a first frequency belonging to a first frequency band and a first voltage applied to the coil or the power provision circuit;
 determine whether a packet related with wireless charging from the external device via the coil is received within a first reference time, the first reference time comprising a periodic reference time;
 in response to having failed to receive the packet within the first reference time, change at least one of an amplitude of the first voltage or the first frequency used for transmitting the power; and
 transmit power to the external device via the coil based on at least one of the changed amplitude of the first voltage or the changed first frequency, and
wherein when an amount of change of the amplitude of the first voltage is greater than a first reference value, the amount of the change of the amplitude of the first voltage is adjusted to be less than the first reference value.

2. The electronic device of claim 1, wherein the control circuit is configured to:
 in response to having failed to receive the packet within the first reference time, change the amplitude of the power transmitted and the first frequency used for transmitting the power.

3. The electronic device of claim 1, wherein the control circuit is configured to:
 in response to having failed to receive the packet within the first reference time, change the first frequency into a second frequency different from the first frequency among the first frequency band.

4. The electronic device of claim 1, wherein the control circuit is configured to:
 after changing the at least one of the amplitude of the power transmitted or the first frequency used for transmitting the power, and in response to receiving the packet within the first reference time, reset the changed amplitude of the power transmitted or the changed first frequency.

5. The electronic device of claim 1, wherein the control circuit is configured to:
 change impedance of the electronic device based on at least one of the changed amplitude of the power transmitted or the changed first frequency; and
 transmit power to the external device via the coil based on the changed impedance.

6. The electronic device of claim 1, wherein the control circuit is configured to:
 judge whether a number of times of continuously failing to receive the packet during a unit time is equal to or is greater than a preset number of times; and
 in response to the number of times of continuously failing to receive the packet being equal to or being greater than the preset number of times, change the at least one of the amplitude of the power transmitted or the first frequency used for transmitting the power.

7. The electronic device of claim 1, wherein the control circuit is configured to:
 change an amplitude of a voltage wherein a value of a control error packet (CEP) received from the external device becomes 0; and
 transmit power to the external device via the coil by using the first frequency belonging to the first frequency band, based on the changed amplitude of the voltage.

8. The electronic device of claim 1, wherein the control circuit is configured to:
 in response to having failed to receive the packet within the first reference time, change an amplitude of a voltage applied to the coil or the power provision circuit, based on a symbol of a lastly recognized control error packet (CEP) among the CEP received from the external device.

9. The electronic device of claim 1, wherein the control circuit is configured to:
 in response to having failed to receive the packet within the first reference time, add a first offset to the at least one of the amplitude of the power transmitted or the first frequency used for transmitting the power.

10. The electronic device of claim 9, wherein the control circuit is configured to:
 judge that the packet has not been received within the first reference time, based on at least one of the amplitude of the power having the first offset added or the first frequency having the first offset added; and
 in response to having failed to receive the packet within the first reference time, change the first offset into a second offset different from the first offset.

11. An operating method of an electronic device, the method comprising:
 authenticating an external device for a transmission of power to the external device;
 transmitting, based on the authentication of the external device, power to the external device via a coil by using a first frequency belonging to a first frequency band and a first voltage applied to the coil or a power provision circuit;
 receiving a packet related with wireless charging from the external device via the coil;
 in response to having failed to receive the packet within a first reference time, changing at least one of an amplitude of the first voltage or the first frequency used for transmitting the power; and
 transmitting power to the external device via the coil based on at least one of the changed amplitude of the first voltage or the changed first frequency,
wherein when an amount of change of the amplitude of the first voltage is greater than a first reference value, the amount of change of the amplitude of the first voltage is adjusted to be less than the first reference value.

12. The method of claim 11, comprising in response to having failed to receive the packet within the first reference time, changing the amplitude of the power transmitted and the first frequency used for transmitting the power.

13. The method of claim 11, comprising in response to having failed to receive the packet within the first reference time, changing the first frequency into a second frequency different from the first frequency among the first frequency band.

14. The method of claim 11, comprising after changing the at least one of the amplitude of the power transmitted or the first frequency used for transmitting the power, and in response to receiving the packet within a second instance of the first reference time, resetting the changed amplitude of the power transmitted or the changed first frequency.

15. The method of claim 11, comprising:
changing impedance of the electronic device based on at least one of the changed amplitude of the power transmitted or the changed first frequency; and
transmitting power to the external device via the coil based on the changed impedance.

16. The method of claim 11, comprising:
judging whether a number of times of continuously failing to receive the packet during a unit time is equal to or is greater than a preset number of times; and
in response to the number of times of continuously failing to receive the packet being equal to or being greater than the preset number of times, changing the at least one of the amplitude of the power transmitted or the first frequency used for transmitting the power.

17. The method of claim 11, comprising:
changing an amplitude of a voltage wherein a value of a control error packet (CEP) received from the external device becomes 0; and
transmitting power to the external device via the coil by using the first frequency belonging to the first frequency band, based on the changed amplitude of the voltage.

18. The method of claim 11, comprising in response to having failed to receive the packet within the first reference time, changing an amplitude of a voltage applied to the coil or the power provision circuit, based on a symbol of a lastly recognized control error packet (CEP) among the CEP received from the external device.

19. The method of claim 11, comprising in response to having failed to receive the packet within the first reference time, adding a first offset to the at least one of the amplitude of the power transmitted or the first frequency used for transmitting the power.

20. The method of claim 19, comprising:
judging whether a time interval of receiving the packet is equal to or is greater than a preset value, based on at least one of the amplitude of the power having the first offset added or the first frequency having the first offset added; and
in response to the time interval of receiving the packet being equal to or being greater than the preset value, changing the first offset into a second offset different from the first offset.

* * * * *